US009918270B2

(12) United States Patent
Kanigicherla et al.

(10) Patent No.: US 9,918,270 B2
(45) Date of Patent: Mar. 13, 2018

(54) WIRELESS INTERFACE SHARING (75) Inventors: Balaji Kanigicherla, Andhra Pradesh (IN); Siva Raghuram Voleti, Andhra Pradesh (IN); Krishna Mohan Tandaboina, Andhra Pradesh (IN); Suman Kopparapu, Andhra Pradesh (IN); Sarveshwar Bandi, Andhra Pradesh (IN); Kapil Hali, Andhra Pradesh (IN)

(73) Assignee: Ineda Systems Inc., Santa Clara, CA (US)

( * ) Notice: Subject to any disclaimer, the term of this patent is extended or adjusted under 35 U.S.C. 154(b) by 104 days.

(21) Appl. No.: 14/112,401

(22) PCT Filed: Apr. 17, 2012

(86) PCT No.: PCT/IN2012/000271
§ 371 (c)(1),
(2), (4) Date: Oct. 17, 2013

(87) PCT Pub. No.: WO2012/143941
PCT Pub. Date: Oct. 26, 2012

(65) Prior Publication Data
US 2014/0044014 A1 Feb. 13, 2014

(30) Foreign Application Priority Data
Apr. 18, 2011 (IN) .......................... 1330/CHE/2011

(51) Int. Cl.
*H04W 40/00* (2009.01)
*H04W 40/24* (2009.01)
*H04L 12/713* (2013.01)

(52) U.S. Cl.
CPC ......... *H04W 40/246* (2013.01); *H04L 45/586* (2013.01); *H04W 40/00* (2013.01)

(58) Field of Classification Search
CPC ... H04W 40/00; H04W 40/24; H04W 40/246; H04L 45/586
See application file for complete search history.

(56) References Cited

U.S. PATENT DOCUMENTS 5,530,860 A * 6/1996 Matsuura .............. G06F 9/5027
718/105
7,139,247 B2 * 11/2006 Desai et al. .................. 370/255
(Continued)

FOREIGN PATENT DOCUMENTS

| CN | 1627728 | 6/2005 |
|---|---|---|
| CN | 101146280 | 3/2008 |

OTHER PUBLICATIONS

International Search Report, PCT/IN2012/000271, China International Search Authority, Completed Sep. 30, 2012, dated Nov. 8, 2012.
(Continued)

*Primary Examiner* — Jeffrey M Rutkowski
*Assistant Examiner* — Jonathan B Wood
(74) *Attorney, Agent, or Firm* — Workman Nydegger (57) ABSTRACT Described herein are methods and system for sharing a wireless interface (102) among various multiple host processors in a multi-processor computing system (100) to provide simultaneous access of a wireless network to the host processors. In one implementation the multi-host computing system (100), comprises a wireless interface (102) configured to connect to at least one of a plurality of wireless networks; and a wireless network access virtualization (WNAV) processor (108) communicatively coupled to the wireless interface (102), wherein the WNAV processor (108) is configured to multiplex data packets received from the plurality of hosts, transmit the multiplexed data packets to at least one of the plurality of wireless networks through the wireless interface (102), receive data packets from one of the
(Continued)

plurality of wireless network through the wireless interface (102) and route the data packets to each of the plurality of hosts based on a media access control (MAC) address associated with each of the plurality of hosts.

16 Claims, 5 Drawing Sheets

(56) References Cited

U.S. PATENT DOCUMENTS

| | | | |
|---|---|---|---|
| 7,464,174 B1 | 12/2008 | Ngai | |
| 7,478,173 B1* | 1/2009 | Delco | H04L 12/2865 709/250 |
| 7,610,330 B1* | 10/2009 | Quinn et al. | 709/201 |
| 7,660,306 B1* | 2/2010 | Eiriksson et al. | 370/392 |
| 7,742,406 B1* | 6/2010 | Muppala | 370/230 |
| 7,843,919 B2* | 11/2010 | Cadigan et al. | 370/389 |
| 7,881,208 B1* | 2/2011 | Nosella et al. | 370/242 |
| 8,111,697 B1* | 2/2012 | Panwar et al. | 370/392 |
| 8,175,057 B2* | 5/2012 | Weniger et al. | 370/331 |
| 8,462,626 B2* | 6/2013 | Desai et al. | 370/231 |
| 8,547,844 B2* | 10/2013 | Nadas et al. | 370/235 |
| 8,560,753 B1* | 10/2013 | Hobbs | G06F 3/1454 345/2.1 |
| 8,605,722 B1* | 12/2013 | Sindhu | H04L 45/16 370/390 |
| 8,630,275 B2* | 1/2014 | Ji et al. | 370/338 |
| 9,106,514 B1* | 8/2015 | Kanadam | H04L 43/04 |
| 2003/0142641 A1* | 7/2003 | Sumner et al. | 370/328 |
| 2003/0200315 A1 | 10/2003 | Goldenberg et al. | |
| 2003/0202486 A1* | 10/2003 | Anton et al. | 370/329 |
| 2004/0146052 A1* | 7/2004 | Chang | 370/392 |
| 2004/0252688 A1* | 12/2004 | May et al. | 370/389 |
| 2005/0025179 A1* | 2/2005 | McLaggan et al. | 370/468 |
| 2005/0089052 A1* | 4/2005 | Chen et al. | 370/401 |
| 2006/0242354 A1* | 10/2006 | Johnsen et al. | 710/316 |
| 2006/0248208 A1* | 11/2006 | Walbeck et al. | 709/230 |
| 2006/0253619 A1* | 11/2006 | Torudbakken et al. | 710/31 |
| 2007/0038743 A1* | 2/2007 | Hellhake et al. | 709/224 |
| 2008/0049630 A1* | 2/2008 | Kozisek et al. | 370/250 |
| 2008/0049639 A1* | 2/2008 | Wiley et al. | 370/252 |
| 2008/0049650 A1* | 2/2008 | Coppage et al. | 370/310 |
| 2008/0089321 A1* | 4/2008 | Arulappan | H04L 49/355 370/386 |
| 2008/0123579 A1* | 5/2008 | Kozat et al. | 370/312 |
| 2009/0172821 A1* | 7/2009 | Daira et al. | 726/27 |
| 2010/0195561 A1* | 8/2010 | Yamaguchi et al. | 370/315 |
| 2010/0246411 A1* | 9/2010 | Meloche | 370/248 |
| 2010/0246416 A1* | 9/2010 | Sinha et al. | 370/250 |
| 2010/0332615 A1* | 12/2010 | Short | H04L 63/08 709/217 |
| 2011/0191506 A1* | 8/2011 | Srinivasan | 710/22 |
| 2011/0317559 A1* | 12/2011 | Kern et al. | 370/235 |
| 2012/0076006 A1* | 3/2012 | DeCusatis | H04L 12/462 370/250 |
| 2012/0078994 A1* | 3/2012 | Jackowski et al. | 709/202 |
| 2012/0096159 A1* | 4/2012 | Short et al. | 709/225 |
| 2012/0099450 A1* | 4/2012 | Madan et al. | 370/252 |
| 2012/0140768 A1* | 6/2012 | Hughes | H04L 49/10 370/389 |
| 2012/0163183 A1* | 6/2012 | Podlyas et al. | 370/241 |
| 2012/0170585 A1* | 7/2012 | Mehra et al. | 370/400 |
| 2012/0250682 A1* | 10/2012 | Vincent et al. | 370/390 |
| 2013/0089094 A1* | 4/2013 | Csaszar et al. | 370/390 |

OTHER PUBLICATIONS

Written Opinion of the International Search Report for PCT/IN2012/000271 dated Nov. 8, 2012.

* cited by examiner

Figure -5

WIRELESS INTERFACE SHARING

CROSS-REFERENCE TO RELATED APPLICATIONS

This application claims priority to and the benefit of PCT Application Serial No. PCT/IN2012/000271, filed on Apr. 17, 2012, entitled "WIRELESS INTERFACE SHARING", which also claims priority to and the benefit of Indian Patent Application No. 1330/CHE/2011, entitled "WIRELESS INTERFACE SHARING", filed on Apr. 18, 2011, which are incorporated herein in their entirety.

TECHNICAL FIELD

The present subject matter, in general, relates to multi-host computing systems and in particular to sharing of a wireless interface in multi-host computing systems.

BACKGROUND

Computing systems, such as laptops, netbooks, workstations, and desktop computers typically include a central processing unit (CPU), also known as a host processor, running an operating system for carrying out various functionalities of the computing system. The host processor generally includes a class of software modules, known as drivers, which interact with and control various peripheral devices connected to the computing systems for providing the functionalities. The peripheral devices include, for instance, mass storage devices for reading and writing data, media devices like audio players for providing output of audio files playing in the computing system, and network interfaces for connecting to a network environment. One example of a network interface may be a Wi-Fi interface.

The system drivers generally interact with the peripheral devices through hardware interfaces, known as device controllers provided in the computing systems for controlling the peripheral devices. For example, a computing system may include a network interface controller for controlling the Wi-Fi interface of the computing system.

With the advent of technology, computing systems with multiple processors supporting different operating systems have come into existence. In order to reduce system costs and power consumption, and often times to maintain compactness of the computing systems, the host processors are configured to share the same peripheral devices.

SUMMARY

This summary is provided to introduce concepts related to sharing of a wireless interface by multiple host processors in a multi-host computing system, which are further described in the detailed description. This summary is not intended to identify essential features of the present subject matter nor is it intended for use in determining or limiting the scope of the present subject matter.

In accordance with one implementation of the subject matter, methods and systems for sharing of the wireless interface by multiple host processors in the multi-host computing device is enabled by a wireless network access virtualization (NAV) processor. The NAV processor allows the multiple host processors to achieve simultaneous access to a wireless network by sharing the wireless interface.

In one embodiment, the method for sharing a wireless interface amongst a plurality of hosts of a multi-host computing system comprises assigning a unique media access control (MAC) address to the wireless interface by each of the plurality of hosts, transmitting a plurality of association requests to an access point of a wireless network to connect the plurality of hosts with the wireless network, based in part on the unique MAC address assigned by each of the plurality of hosts, and routing received data packets to at least one of the of the plurality of hosts, based in part on the MAC address associated with the received data packets.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale.

DETAILED DESCRIPTION

The present subject matter describes a method and system for enabling simultaneous access of a wireless interface, such as a Wi-Fi interface, to multiple host processors in a multi-host computing system. Such methods and systems may be implemented in various multi-host computing systems, examples of which include, but are not restricted to, computing devices, such as mainframe computers, workstations, personal computers, desktop computers, minicomputers, servers, multiprocessor systems, and laptops; cellular communicating devices, such as personal digital assistants, smart phones, and mobile phones.

Conventional computing systems include a single host processor. In such a computing system, the wireless interface is configured to interface with only one host processor while, at the same time, the host processor is configured to control and communicate with a dedicated wireless interface.

Recent times have witnessed a rapid convergence between consumer electronic devices and personal computer (PC) class devices. Many devices, for example, smart phones are compact and yet possess computing capabilities like a PC, combine the features of consumer electronic devices and PC class devices and have a huge demand in the market.

The consumer electronic devices and personal computer PC-class devices are characterized by their own distinctive classes of hardware, operating systems and user interfaces. For example, cell phones typically incorporate low-power processors that consume less resources such as memory, processing power and battery power, while a PC class device such as, a laptop may provide better performance or support more applications, however, consume more power. To enable convergence of the consumer electronic devices with the PC class devices, multi-host computing systems are implemented.

For example, the multi-host computing systems, like a handheld device, may comprise two host processors, host 1 and host 2, where each host processor supports a respective operating system to perform different functions on the same hardware platform. Each operating system may provide a particular advantage over the other operating system in the computing system. For example, host 1 and host 2 may run two different operating systems, OS 1 and OS 2, where the OS 1 may provide better performance or support more applications than OS 2, however, the OS 2 may consume less resources such as memory, processing power, battery power compared to OS 1. In such a scenario, the multi-host computing system may implement OS 1 for application processing and computational purposes when the multi-host computing system is running on a power supply, whereas may implement OS 2 when the handheld device is operated on battery power.

Thus, the multi-host computing systems allow more than one host processor to operate on the same hardware platform, concurrently. Such concurrent operation of heterogeneous host processors with their respective operating systems within the same hardware platform may require many peripheral devices, such as wireless interfaces to be duplicated, resulting in a very high bill of material (BOM) cost for the multi-host computing systems. In order to reduce costs, as well as to maintain compactness of the multi-host computing systems, re-use or sharing of the peripheral devices, such as wireless interfaces between the host processors, is required.

Several conventional approaches, such as I/O virtualization techniques, have been implemented which enable re-use or sharing of the peripheral devices such as wireless interfaces. In general, I/O virtualization techniques relate to a capability of I/O devices to be used by more than one system image, in other words, by more than one operating systems executing on a single host processor.

Though the description of the I/O device provided hereinafter is in context of 802.11 standard based Wi-Fi interface, it will be appreciate that the concepts explained in context thereto may be extended to various other wireless interfaces operating on different protocols without deviating from the scope of the present subject matter. Also, the terms 'Wi-Fi interface' and 'wireless interface' have been interchangeably used throughout the description.

Conventionally, one of the host processors in the multi-host computing system has access to the physical Wi-Fi interface, and shares the Wi-Fi interface with another guest operating systems using a virtualization intermediary or a hypervisor. The operating system, that has direct access to the physical Wi-Fi interface, acts as an internet protocol (IP) router to data packets sent by the other guest operating systems sharing the Wi-Fi interface. Details conventionally known in the art have been omitted for sake of brevity.

This conventional virtualization technique only allows the wireless interface to be shared among multiple operating systems running on single host in form of virtual machines. Further, this approach also makes the guest operating systems that use indirect Wi-Fi connection invisible to outside networks. Additionally, this approach requires that the operating system which has the ownership of the access to physical Wi-Fi interface should always be active or in powered ON state.

In another conventional approach, the wireless interface may be configured to be capable of supporting two media access control (MAC) addresses. The wireless interface is shown to an OS as two independent Wi-Fi interfaces thus allowing a host processor to have two connections to two different wireless networks, such as a wireless personal area network (WPAN) and a wireless local area network (WLAN) at one time. However, again this mechanism limits use of the wireless interface to a single host processor.

In one more conventional approach, a single wireless interface is shown as multiple interfaces to an OS where the multiple interfaces could associate with several access points at the same time or simultaneously be part of different ad-hoc networks. A driver module switches the single wireless interface across various wireless networks transparent to the OS. This method too enables only a single host processor to access multiple wireless networks at the same time.

Systems and methods for simultaneous sharing of a wireless interface by multiple host processors in a multi-host computing system are described. The multi-host computing system comprises more than one host processors, where each host processor supports an operating system, to perform different functions on the same hardware platform. The systems and methods can be implemented in a variety of multi-host computing systems. The multi-host computing system may include, but are not limited to, desktop computers, handheld devices, laptops or other portable computers, mobile phones, personal digital assistants (PDA's), tablet PCs, netbooks, workstations, etc., which implement multiple processors on the same hardware platform. In one implementation, the methods and systems for sharing of the wireless interface can be implemented for multi-host computing systems running any operating system such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art.

According to one embodiment of the present subject matter, methods and systems for concurrent sharing of the wireless interface by multiple host processors in the multi-host computing device are enabled by a wireless network access virtualization (NAV) processor.

The NAV processor implements virtualization techniques to enable the sharing of the wireless interface. In general, the virtualization techniques, such as I/O virtualization is a methodology which transforms accesses between standard I/O devices and host processors such that the I/O devices can be shared across multiple system images or hosts in a way which hides the sharing from both the host processor and the shared I/O devices. In computing systems supporting I/O virtualization, address remapping is generally used to enable assignment of the I/O devices to the host processors.

Examples of the I/O devices may include network interfaces, storage devices, communication devices, human interface devices, audio devices, etc. Conventional I/O device are not multi-host aware device, or in other words, native I/O devices are not configured to deal with more than one host. Accordingly, the virtualization techniques need to ensure that these I/O devices are imparted the capability to interact with the multiple hosts. To reiterate, in case of a native Wi-Fi interface, the virtualization is needed since conventionally available host processors are configured to work with a dedicated Wi-Fi interface and similarly conventional Wi-Fi interfaces are configured to interact with a single host and are incapable of interacting with one or more than one host processors. Further, the conventional Wi-Fi interfaces are configured to associate with a single access point or a single ad-hoc Wi-Fi network at any given instant of time.

The NAV processor includes a Wi-Fi virtualization manager and a L2 switch to enable a native wireless interface to communicate with multiple host processors in the multi-host computing system to provide them simultaneous access to one or more wireless networks. Further, the wireless interface associates with an access point. In one embodiment, the association between the wireless interface and the access point is made on per host processor basis, i.e., the wireless interface sends an access request on behalf of each host processor and makes as many associations with the access point as the number of host processors. Further, in said embodiment, the wireless interface may be configured to operate in a promiscuous mode such that data packets associated with the MAC addresses pertaining to each of the host processors are received by the wireless interface. The Wi-Fi virtualization manager and the L2 switch manage the association requests and handle the data packets received by the multiple hosts based on the MAC addresses.

In another embodiment, the wireless interface is configured as station bridge and makes only one association with the access point. Since the access point sees the wireless interface as a station bridge, the access point assumes that there may be many hosts processors associated with the station bridge and forwards all data packets pertaining to the MAC address of the associated hosts processors to the wireless interface. Again, the Wi-Fi virtualization manager and the L2 switch manage the routing of the data packets to the respective host processors.

Methods and systems for sharing of wireless interface in multi-host computing systems running multiple operating systems are hereinafter explained in a detailed manner with reference to FIGS. 1 to 4. While aspects of the described systems and methods can be implemented in any number of different computing systems, environments, and/or configurations, the embodiments are described in the context of the above exemplary system architecture(s). For the ease of understanding, the explanation herein is in context of a multi-host computing system having two host processors. However, it will be appreciated by one skilled in the art, that although the methods and systems have been described with respect to two host processors, the concept explained in context thereto may be extend to any number of host processors.

Figure 1:
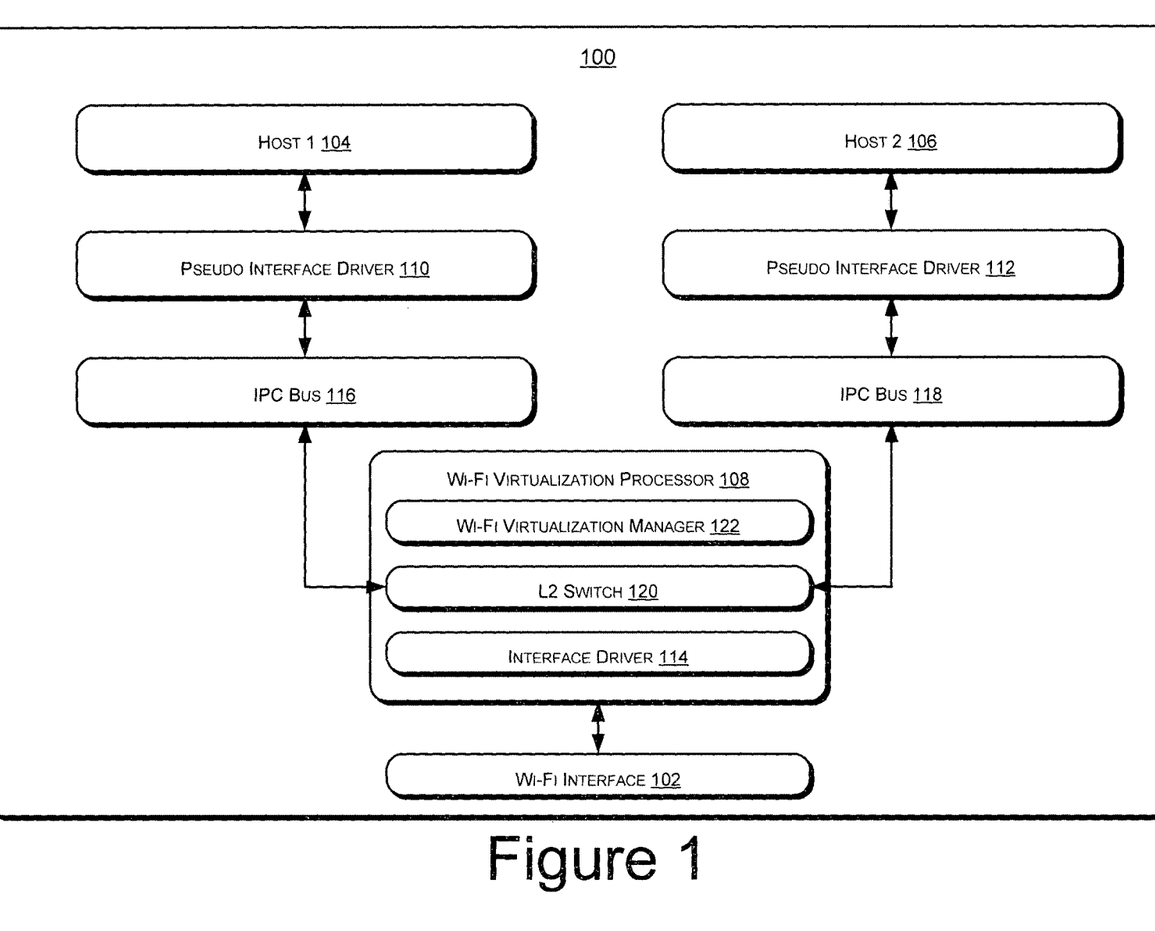
FIG. 1 shows an exemplary system for sharing a Wi-Fi interface, in accordance with an embodiment of the present subject matter.

FIG. 1 shows an exemplary system 100 for sharing a Wi-Fi interface 102, in accordance with an embodiment of the present subject matter. In accordance with the embodiment depicted in the FIG. 1, the Wi-Fi interface 102 is used by two host processors, namely a first host processor 104 and a second host processor 106 to access one or more wireless networks. The system 100 includes a wireless network access virtualization (NAV) processor 108 for virtualization of the Wi-Fi interface 102. The Wi-Fi interface 102 is virtualized to enable sharing of the Wi-Fi interface 102 among the two host processors, i.e., the first host processor 104 and the second host processor 106.

The first and second host processors 104 and 106 comprise a first and second pseudo interface drivers 110 and 112, respectively. The pseudo interface drivers 110 and 112 are individually communicatively coupled to the NAV processor 108. The NAV processor 108 incorporates an interface driver 114 to which the first and the second pseudo interface drivers 110 and 112 are interfaced. The interface driver 114 directly configures and controls the Wi-Fi interface 102. The interface driver 114 sends and receives data packets to and from the first and the second pseudo interface drivers 110 and 112 of the first and the second host processors 104 and 106, respectively, to the Wi-Fi interface 102. Accordingly, the first and the second pseudo interface drivers 110 and 112 exchange data and control information with the NAV processor 108.

In one embodiment, the first and the second pseudo interface drivers 110 and 112 are network interface drivers but do not include lower layer hardware driver interfaces. The first and the second pseudo interface drivers 110 and 112 emulate the functioning of the interface driver 114, keeping the sharing of Wi-Fi interface 102 transparent to the first and the second host processor 104 and 106. The interface driver 114, in one embodiment, is a native Wi-Fi adapter, configured to packetize and send data to a wireless network. From the perspective of the operating system of the first and the second host processors 104 and 106, the first and the second pseudo interface drivers 110 and 112, respectively, are the native Wi-Fi adapter, the functionality of which is herein imparted to the interface driver 114.

The interface driver 114 implements interfaces to communicatively couple the Wi-Fi interface 102 to the first and the second host processors 104 and 106 through a first and a second inter processor communication (IPC) bus 116 and 118, respectively. In one embodiment, the first and the second IPC bus 116 and 118 are high bandwidth IPC bus that provides a lossless, low latency, high bandwidth communication mechanism between the Wi-Fi interface 102 and the first and the second host processors 104 and 106. More details relating to the IPC bus 116 and 118 are provided with respect to FIG. 2.

Thus, the first and the second pseudo interface drivers 110 and 112 communicate with the NAV processor 108 to interface the first and the second host processors 104 and 106 with the Wi-Fi interface 102. Accordingly, the data packets received from the Wi-Fi interface 102 are routed to the respective host processors 104 and 106 through the NAV processor 108. For the purpose, the NAV processor 108 implements a L2 switch 120 to forward data packets to the first and the second host processors 104 and 106 based on a MAC address associated with the first and the second host processors 104 and 106. In other words, the interface driver 114 operates in association with the L2 switch 120 to send and receive data packets to and from the host processors 104 and 106 to the Wi-Fi interface 102.

In one embodiment, the L2 switch may be a conventionally known switching module configured to switch data packets to a plurality of MAC addresses. Details conventionally known in the art have been omitted for the sake of brevity. In one implementation, the L2 switch 120 may be a software L2 switch. However, various other implementations of the L2 switch 120, such as a hardware implementation or an implementation having a combination of hardware and software are also possible.

In operation, the first and the second host processors 104 and 106 configure the Wi-Fi interface 102 independently through their respective pseudo interface drivers 110 and 112. Configuration parameters communicated to the Wi-Fi interface 102 from each of the first and the second host processors 104 and 106 are in turn communicated to the L2 switch 120 to configure the L2 switch 120 so as to be accessed independently by each of the first and the second host processors 104 and 106.

In one embodiment, the L2 switch 120 implements a Wi-Fi virtualization manager 122, which manages the configuration with an access point (not shown in the Figures). The Wi-Fi virtualization manager 122 multiplexes the data packets from the first and the second host processors 104 and

106 and sends multiplexed data packets on the wireless network. Further, Wi-Fi virtualization manager 122 arbitrates between the first and the second host processors 104 and 106 in cases where both the host processors 104 and 106 communicate with the Wi-Fi interface 102 simultaneously. For example, the first host processor 104 and the second host processor 106 may simultaneously send request to the Wi-Fi interface 102 to connect to an access point, in such a case, the Wi-Fi virtualization manager 122 establishes connectivity by arbitrating between the two requests based on a predetermined arbitration logic. The predetermined arbitration logic may be based on any generally known arbitration mechanism(s) to prioritize either one of the first and the second host processors 104 and 106.

As will be apparent to one having ordinary skill in the art, the arbitration performed herein by the Wi-Fi virtualization manager 122 is for transmitting commands from the first and the second host processors 104 and 106 to the Wi-Fi interface 102. The data from the first and the second host processors 104 and 106, on the other hand, is sent to the Wi-Fi interface 102 through the L2 switch 120 via the first and the second IPC bus 116 and 118, respectively.

Hence, the L2 switch 120 handles data traffic in three directions, two from both first and the second host processors 104 and 106 and one from the Wi-Fi interface 102. There is a dedicated amount of buffer memory within the L2 switch 120 to store the packets temporarily if the L2 switch 120 is busy. The L2 switch 120 may also store thereon a fixed destination address based forwarding table (also referred to as forwarding table) with MAC address entries per host 104.

On the receiving side, Wi-Fi virtualization manager 122 forwards the data packets coming from the Wi-Fi interface 102 to the L2 switch 120 for sending the same to appropriate host processor from amongst the first and the second host processors 104 and 106, based on the destination MAC address specified in the data packets. Further, the Wi-Fi virtualization manager 122 forwards any broadcast and multicast data packets to all the host processors within the system 100.

In addition, the L2 switch 120 also allows for direct communication between the first and the second host processors 104 and 106. For example, when the first host processor 104 tries to communicate with the second host processor 106, the MAC address associated with the second host processor 106 is identified and the data packets received from the first host processor 104 are forwarded directly from the L2 switch 120 to the second host processor 106 instead of sending the data packets on the wireless network and receiving them back.

In one implementation, the NAV processor 108 may be a standalone unit or independent unit associated with the Wi-Fi interface 102 while in another embodiment the NAV processor 108 may be implemented as a logical/function module within the Wi-Fi interface 102. While the later embodiment may be preferred for more compact computing devices, the former embodiment may be useful in adopting legacy or native Wi-Fi interfaces to multi-host processor environment. It will be appreciated that in the two aforementioned embodiments, as well as those that will be explained later, the NAV processor 108 may have a hardware implementation, a software implementation or a combination thereof.

In one embodiment, the NAV processor 108 may a multi-root aware device, capable of communicating with more than a single host processor and may be visible to the different host processors in a multi-host computing system as a peripheral component interconnect express (PCIe) device. Accordingly, the NAV processor 108 may appear as a separate PCIe function in the configuration space associated with each of the multiple host processor. The NAV processor 108 may occupy different PCIe memory ranges and can have different settings for various peripheral component interconnect (PCI), configuration registers. In one implementation, the common data/configuration settings, i.e., cross device configurations may be kept isolated. Thus, the NAV processor 108, although a single physical device, may appear as like multiple devices the different host processors in the multi-host computing system.

Figure 2:
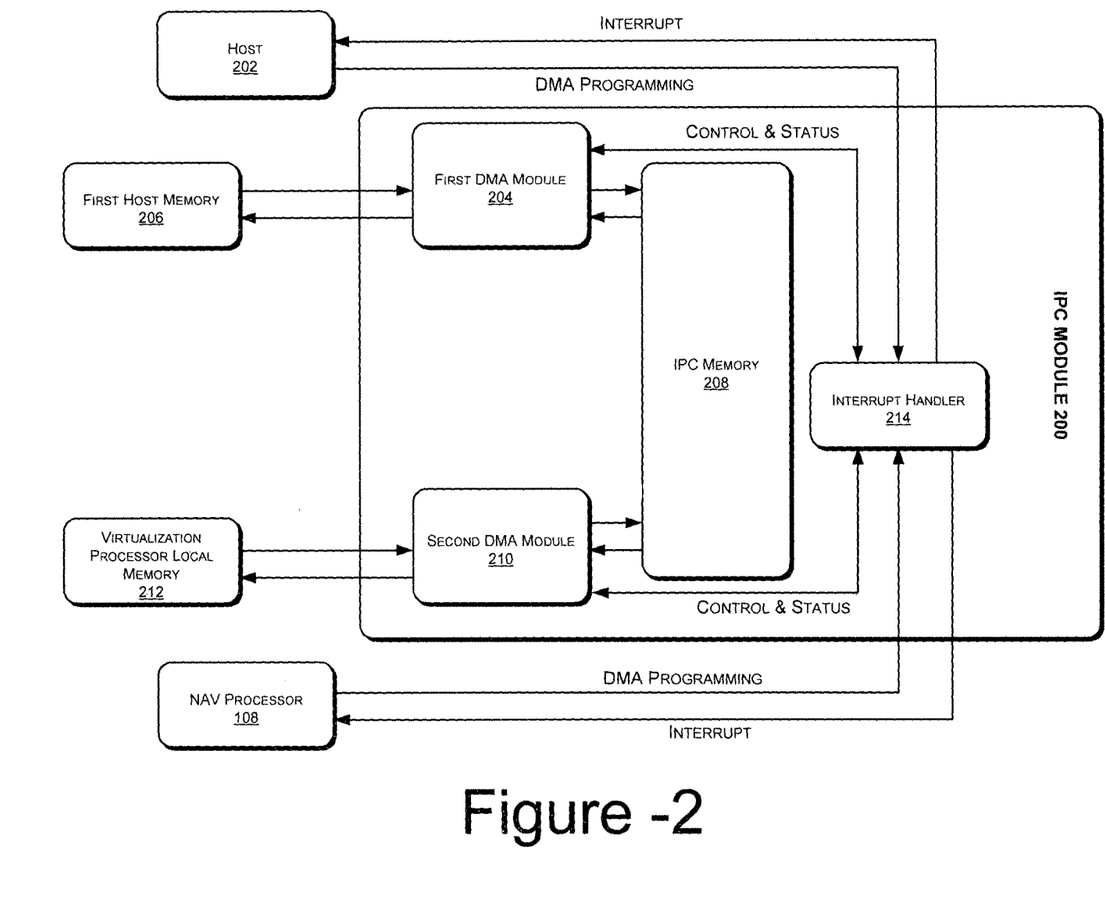
FIG. 2 illustrates an exemplary (inter-process communication) IPC bus, according to one embodiment of the present subject matter.

FIG. 2 illustrates an exemplary IPC module 200, such as the aforementioned first IPC bus 116 or the second IPC bus 118, according to one embodiment of the present subject matter. It will be appreciated that in one embodiment, the first IPC bus 116 or the second IPC bus 118 are structurally and functionally identical to each other as well as to the IPC module 200 explained herein.

The IPC module 200 is an inter processor communication bus which may provide high speed communication between different processors. The IPC module 200 may provide a high bandwidth, dedicated and lossless channel between any two processors, which may optimize error recovery and network latency. With the use of the IPC module 200 two processors can communicate without any networking protocol overhead, and can achieve high speed data transfers.

As apparent to on skilled in the art, in the present case the first and the second IPC bus 116 and 118 are placed between the first and the second host processors 104 and 106 and the NAV processor 108, respectively. Accordingly, in the present case, the IPC module 200 may be considered as a means for communicatively coupling either one of the first and the second host processors 104 and 106 with the NAV processor 108. For the ease of explanation the first and the second host processors 104 and 106 have been collectively referred to as host 202.

In operation, if the host 202 has to transmit data to the NAV processor 108, a first memory access (DMA) module 204 of the IPC module 200, associated with the host 202, fetches a transmit data descriptor pertaining to the data to be transmitted from a memory component of the host 202. The memory component of the host 202 may be referred to as first host memory 206. The transmit data buffer descriptor is interpreted and accordingly the data to be transmitted is accesses from the first host memory 206 and placed in a local memory component of the IPC module 200, referred to as IPC memory 208.

A second DMA module 210 associated with the NAV processor 108 is provided a receive data descriptor indicating a location in the IPC memory 208 where the data is placed. The second DMA module 210 interprets the same, and accordingly reads the data from the IPC memory 208. This data is written onto a virtualization processor local memory 212 of the NAV processor 108. The location in the virtualization processor local memory 212 where the data is written is in accordance with the receive data descriptor.

This process continues on transmit and receive sides seamlessly providing a high throughput communication channel between the first and the second host processors 104 and 106 and NAV processor 108. Throughout the process the interrupts are handled by an interrupt handler 214. It will be understood that in a multi-host computing system comprising several host processors, an IPC module 200 is provided between every host processor and the NAV processor 108.

The IPC module 200 provides a lossless, low latency, high bandwidth communication mechanism between the multiple processors. In one embodiment, the IPC module 200 also provides PCIe configuration for host processors that support PCIe device model. For host processors that do not support PCIe based device model, the IPC module 200 will allow host processors to access the interface through any other supported device model (AXI, AHB etc). The host processors and the Wi-Fi virtualization processor run interface drivers to send and receive data on this IPC module 200.

It will also be appreciated by those skilled in the art that the words during, while, simultaneously, concurrently, and when as used herein are not exact terms that mean an action takes place instantly upon an initiating action but that there may be some small but reasonable delay, such as a propagation delay, between the initial action and the reaction that is initiated by the initial action.

Figure 3:
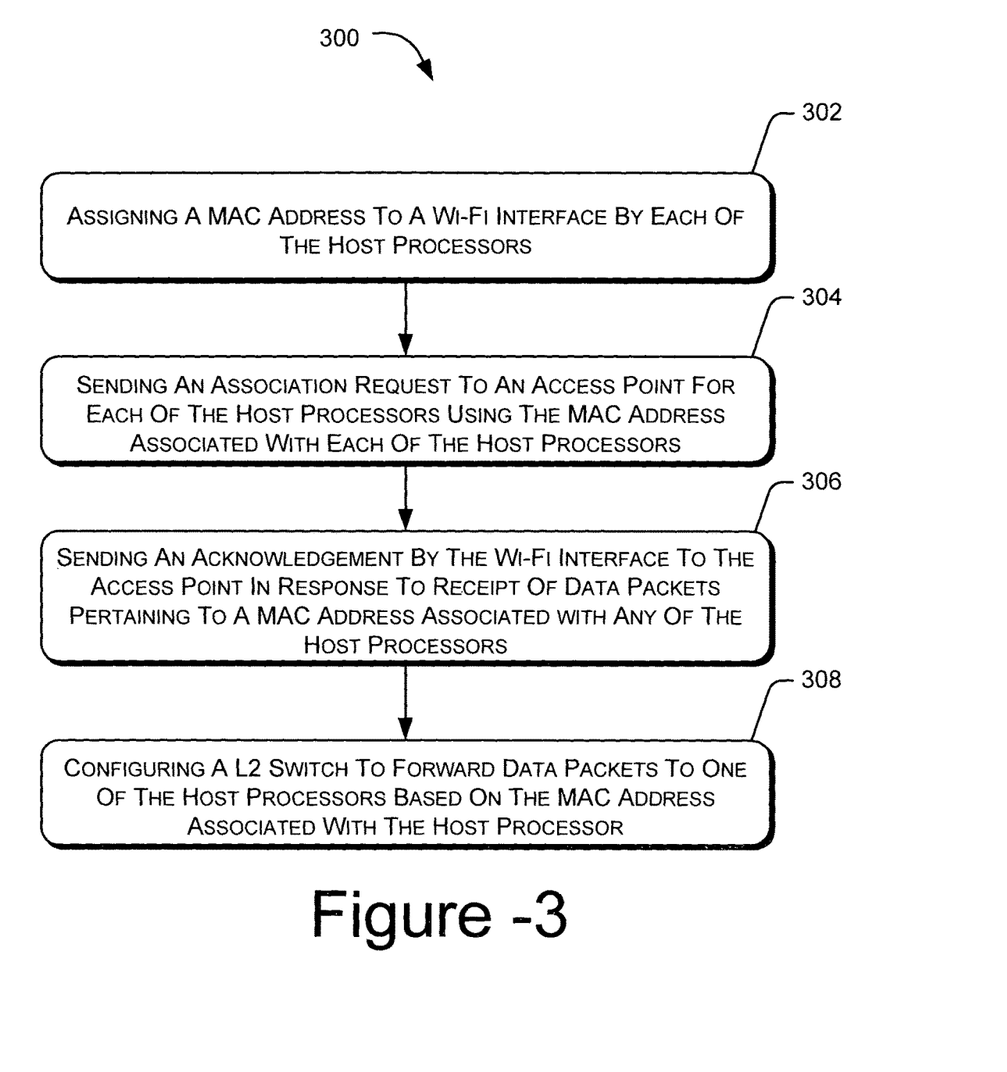
FIG. 3 illustrates an exemplary method for sharing a Wi-Fi interface, in accordance with an embodiment of the present subject matter.
Figure 4:
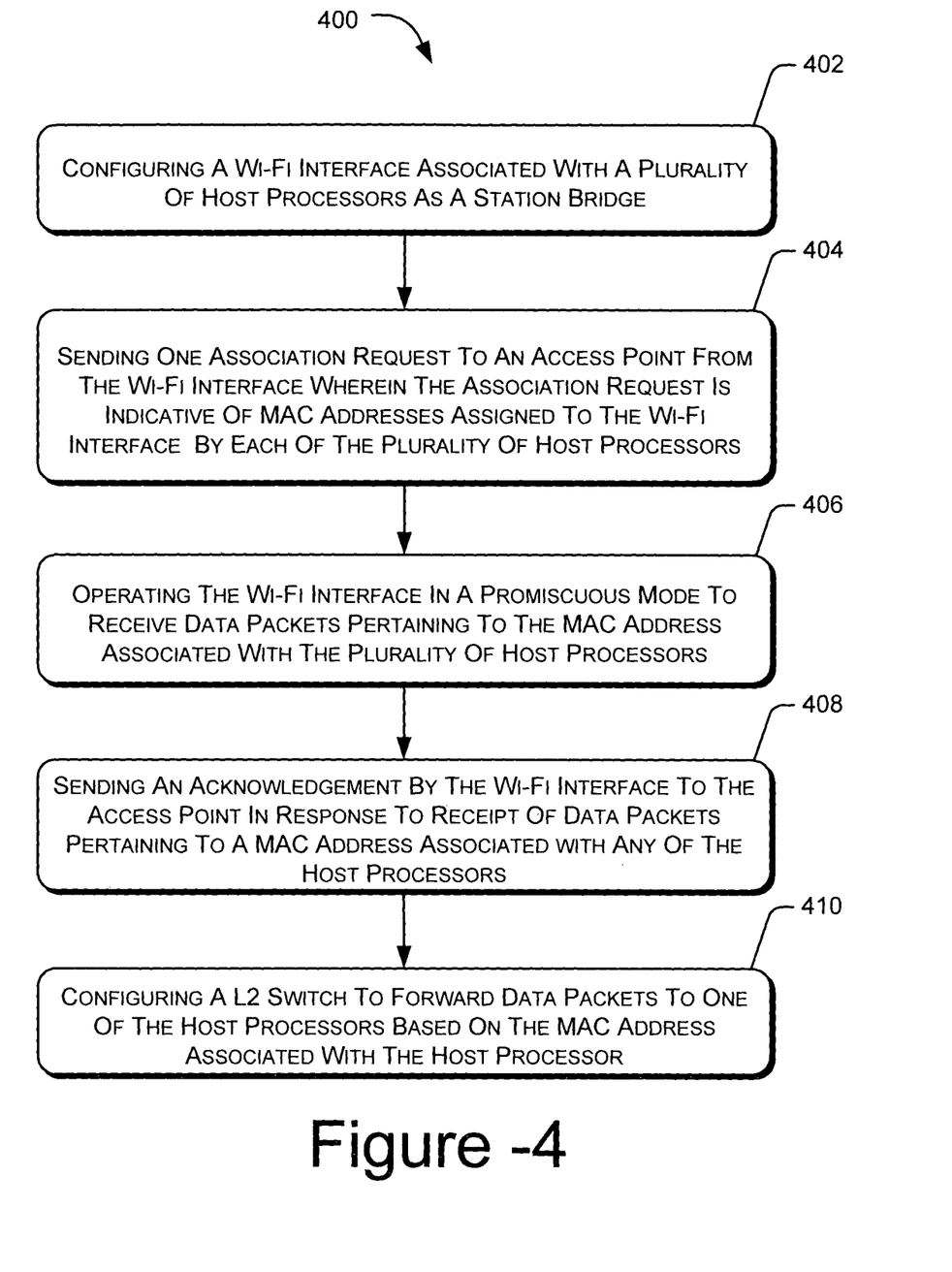
FIG. 4 shows another exemplary method for sharing a Wi-Fi interface, in accordance with an embodiment of the present subject matter.

FIG. 3 and FIG. 4 illustrate an exemplary method for sharing a Wi-Fi interface amongst more than one host processor in a multi-host computing system, in accordance with two different embodiments of the present subject matter.)

FIG. 3 and FIG. 4 illustrates exemplary virtualization methods 300 and 400, respectively, for sharing a Wi-Fi interface. The methods 300 and 400 may be implemented in a variety of computing systems, however for the ease of understanding, the methods 300 and 400 have been explained to be implemented in the system 100 for sharing a Wi-Fi interface as described in FIG. 1.

The virtualization methods 300 and 400, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method.

The order in which the virtualization methods 300 and 400 are described is not intended to be construed as a limitation, and any number of the described method blocks can be combined in any order to implement the methods, or an alternative methods. Additionally, individual blocks may be deleted from the methods without departing from the spirit and scope of the subject matter described herein. Furthermore, the methods can be implemented in any suitable hardware, software, firmware, or combination thereof.

The virtualization method 300 is initiated at block 302 where a MAC address is assigned to a Wi-Fi interface, say, Wi-Fi interface 102, which is being shared by multiple host processors, for example first and the second host processors 104 and 106, in a multi-host computing system, as seen on each of the host processors.

The Wi-Fi interface 102 makes an association with the access point as part of connection set-up. Such association is necessary in order to synchronize a radio network interface card (NIC) at the Wi-Fi interface 102 with the access point regarding important information such as supported data rates. The radio NIC initiates the association by sending an association request frame containing elements such as Service Set Identifier (SSID) and supported data rates. The access point responds by sending an association response frame containing an association ID and other information regarding the access point. Once the radio NIC and access point complete the association process, the access point and the Wi-Fi interface can send data packets to each other.

Accordingly, at block 304, based on each of the MAC address assigned to the Wi-Fi interface 102, an independent association request with the access point for each of the host processors is sent. In one implementation, the multiple independent association requests may be enabled by the afore-described NAV processor 108.

In one implementation the Wi-Fi interface 102 cards may not be capable of supporting more than one MAC address at the same time. For example, after the first successful association between the Wi-Fi interface 102 and the access point, based on the MAC address associated with the first host processor 104, the Wi-Fi interface 102 discards the data packets with a MAC address other than the MAC address associated with the first host processor 104. In such cases, the Wi-Fi interface 102 may be put into promiscuous mode. In the promiscuous mode the Wi-Fi interface 102 is configured to support more than one association with the access point. In one example, the firmware of the Wi-Fi interface 102 may be altered to impart the functionality of making multiple connections with the same access point to the Wi-Fi interface 102. Accordingly, multiple association requests corresponding to more than one host processors, in this case first and the second host processors 104 and 106, with different MAC address may be issued to the access point.

Thus, further to the multiple independent association requests from the same Wi-Fi interface 102, more than one associations with the access point are made. Specifically, in the considered example, one association each for the first and the second host processors 104 and 106 is made. The access point maintains details, such as the association IDs of the more than one host processors with different MAC addresses in accordance with the 802.11 standard specifications. As apparent to one skilled in the art, the access point operates in a conventionally known manner, and accordingly, to maintain ease of description, conventionally known details are omitted.

Once the associations for each of the first and the second host processors 104 and 106 have been established, the access point begins sending data packets belonging to the first and the second host processors 104 and 106 to the Wi-Fi interface 102. At block 306, the Wi-Fi interface 102 sends acknowledgement in response to the receipt of data packets pertaining to the MAC addresses associated with any of the host processors, i.e., first and the second host processors 104 and 106. In one embodiment, the Wi-Fi interface 102 is configured to send the acknowledgement. It will be appreciated that in one embodiment such a configuration may be carried out by bringing about a change in the firmware of the Wi-Fi interface 102.

The data packets pertaining to the MAC addresses associated with any of the host processors, i.e., the MAC addresses associated with either the first or the second host processors 104 and 106, received at the Wi-Fi interface 102, are forwarded to the appropriate host processor which may be either the first host processor 104 or the second host processor 106, at block 308. The forwarding may be based on the MAC addresses associated with the first and the second host processors 104 and 106. In one implementation, the MAC addresses are configured in a switching module, such as the previously described L2 switch 120 of the NAV processor 108, based on which the L2 switch 120 forwards the incoming packets to the appropriate hosts.

Multicast and broadcast packets are forwarded to the first as well as the second host processors 104 and 106. Any other data packets not associated with the MAC address of either the first host processor 104 or the second host processor 106 are dropped by the L2 switch 120. Thus, the penalty for running the device in promiscuous mode is not passed on to the first and the second host processors 104 and 106.

FIG. 4 illustrates another exemplary method 400 for sharing the Wi-Fi interface 102 amongst the first and the second host processors 104 and 106 in a multi-host computing system.

To enable sharing of the Wi-Fi interface 102 amongst the first and the second host processors 104 and 106, at block 402, the Wi-Fi interface 102 is configured as a station bridge. Declaring the Wi-Fi interface 102 as a station bridge makes the access point assume that there may be many hosts behind the station bridge.

In the method 400, only one MAC address is configured in the Wi-Fi interface 102. In one embodiment, this MAC address could be the MAC address assigned to the Wi-Fi interface 102 by any of the first or the second host processors 104 and 106. In another embodiment, this MAC address could include a separate MAC address that is available with the NAV processor 108. The NAV processor 108 runs a single association with access point only with this MAC address. For the purpose, an association request sent to the access point, at block 404, for establishing the association, indicates to the access point the MAC addresses of all the host processors, in this case the first and the second host processors 104 and 106, associated with the Wi-Fi interface 102. In said embodiment, the access point is configured to recognize that the non-access point station is acting as a station bridge.

Further to the single association, data packets are sent and received between the Wi-Fi interface 102 and the access point. In one implementation, at block 406, the Wi-Fi interface 102 is put in a promiscuous mode. This enables the Wi-Fi interface 102 to receive data packets pertaining to the MAC addresses associated with the first as well as the second host processors 104 and 106. At block 408, the Wi-Fi interface 102 sends an acknowledgement in response to receipt of data packets associated with the MAC addresses of the first or the second host processors 104 and 106.

At block 410, when data packets associated with the MAC addresses of the first or the second host processors 104 and 106 are received, the L2 switch 120 of the NAV processor 108 routes them to the first or the second host processors 104 and 106. The L2 switch 120 is configured to receive the data packets from the Wi-Fi interface 102 and forward the data packets to the first or the second host processors 104 and 106 based on the destination MAC address.

Multicast and broadcast packets are forwarded to both the first and the second host processors 104 and 106. The data packets that are not multicast or broadcast or do not belong to either of the first or the second host processors 104 and 106, i.e., data packets having a MAC address not configured in the Wi-Fi interface 102, are dropped in the L2 switch 120.

The aforementioned method 400 of sharing of the Wi-Fi interface 102 amongst the first and the second host processors 104 and 106 may involve some changes in the configuration of the access point and/or of the Wi-Fi interface 102. It will appreciated that the changes may be carried out in several different ways including, for example, a change in the firmware of the access point and/or of the Wi-Fi interface 102.

In one embodiment, the access point may be configured to accept data packets from the Wi-Fi interface 102 that is associated with the access point but sends packets with a MAC address other than the MAC address with which the Wi-Fi interface 102 is associated with the access point.

Further, the Wi-Fi interface 102 and the access point may be configured to support additional vendor specific information element in the association request for declaring the Wi-Fi interface 102 as a non-access point station bridge. Furthermore, the access point may be configured to forward the data packet whose destination MAC address is not present in an association ID table, i.e., data packet whose destination MAC address is not indicated to the access point in the association request, to all Wi-Fi interface 102 associated with that access point.

Figure 5:
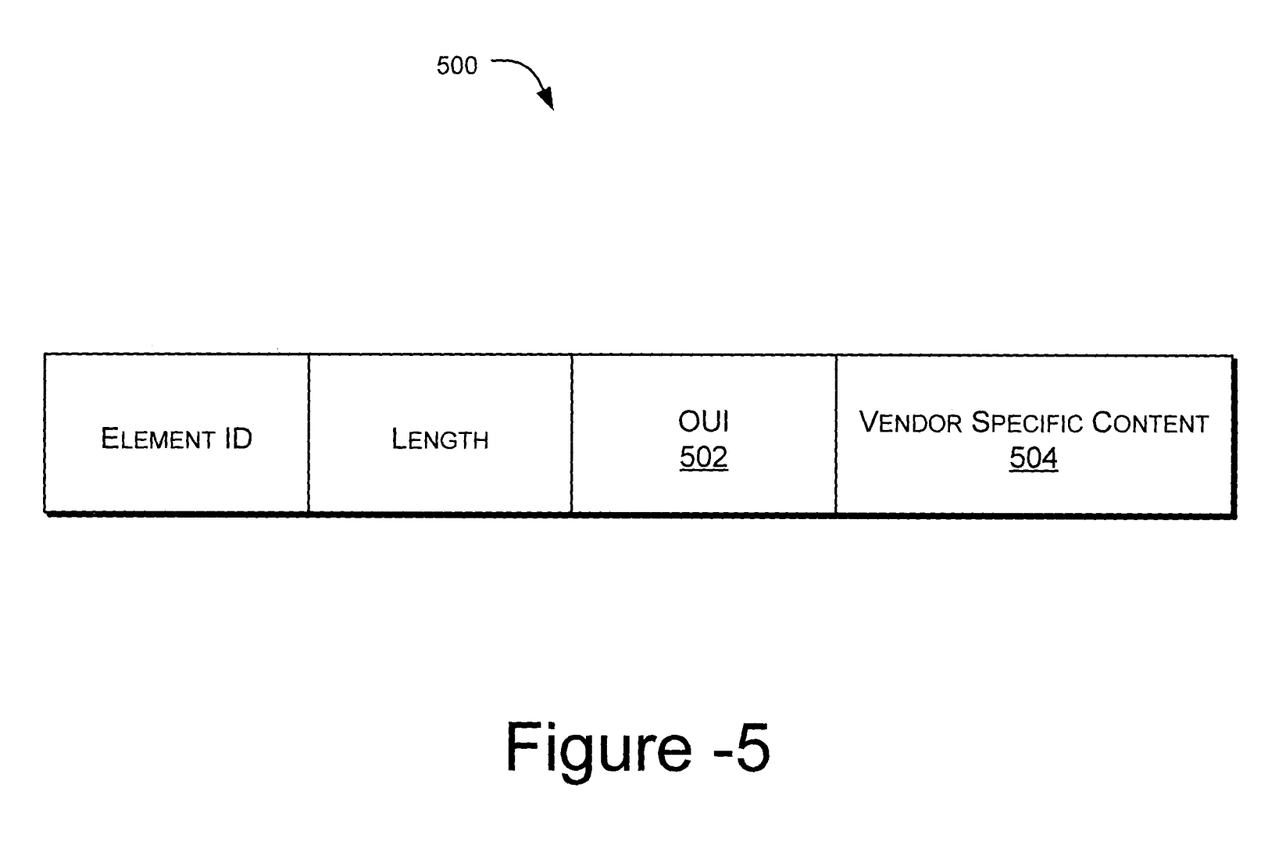
FIG. 5 depicts an association request frame in accordance with one embodiment of the subject matter.

In one embodiment, a capabilities information element relating to the Wi-Fi interface 102 operating as a station bridge, may be configured to include two optional fields in an association request frame to indicate that the Wi-Fi interface 102 is a station bridge and to specify the multiple MAC addresses to be mapped to the single association to the access point. In one example, this can be achieved by supporting additional vendor specific information elements in the association request frame.

FIG. 5 depicts an association request frame 500 in accordance with one embodiment of the subject matter. As illustrated, along with other conventionally known fields, such as an organizationally unique identifier (OUI) field 502, a vendor specific information element 504 is included in the association request frame 500.

In one embodiment, the OUI field 502 that identifies each of the said vendor specific information in the association request frame, sent by Wi-Fi interface 102 which is configured as a station bridge, has IEEE assigned value. In one example, the vendor specific information element 504 for the MAC addresses mapped to the single association ID may follow the vendor specific information element 504 for the Wi-Fi interface 102 configured as the station bridge and may contain the individual MAC addresses.

Accordingly, the access point may communicate with the Wi-Fi interface 102 configured as a station bridge to enable sharing of the Wi-Fi interface 102 amongst the first and the second host processors 104 and 106 in a multi-host computing system.

The systems and methods for sharing of a Wi-Fi interface amongst the multiple host processors in a multi-host computing system can also be extended on the same lines from the above described infrastructure networks to ad hoc Wi-Fi networks. In ad hoc Wi-Fi network, the host processors share the connection made between Wi-Fi interface and the ad hoc network.

Although implementations of systems and methods for sharing of a Wi-Fi interface amongst the multiple host processors in a multi-host computing system have been described in language specific to structural features and/or methods, it is to be understood that the invention is not necessarily limited to the specific features or methods described. Rather, the specific features and methods are disclosed as exemplary implementations for the systems and methods for sharing of a Wi-Fi interface in a multi-host computing system.

We claim:

1. A multi-host computing system to provide for simultaneous access of a wireless interface to a plurality of host processors, the multi-host computing system comprising:

the plurality of host processors each associated with a Media Access Control (MAC) address, each of the plurality of host processors comprises a pseudo interface driver;

the wireless interface, communicatively coupled to the plurality of host processors concurrently through respective pseudo interface drivers, wherein the wireless interface is configured to connect to at least one of a plurality of wireless networks by making at least one association with an access point of the at least one of the plurality of wireless networks, wherein the wireless interface is configured as at least one of:
a station bridge to project to the access point that the plurality of host processors are associated with the station bridge wherein the access point communicates with the wireless interface configured as the station bridge to enable the sharing of the wireless interface among the plurality of host processors; and
a Wireless Network Access Virtualization (WNAV) processor communicatively coupled to the wireless interface and the respective pseudo interface driver, to provide simultaneous access of the plurality of wireless networks to the plurality of host processors, the WNAV processor comprising:
an L2 switch, wherein each host processor is communicatively coupled to the L2 switch by an Inter Processor Communication (IPC) bus and the IPC bus provides lossless communication between the host processor and the WNAV, wherein each host processor is communicatively coupled to the L2 switch by a separate IPC bus, and wherein the L2 switch allows direct communication between any two host processors from amongst the plurality of host processors based on MAC address information of a host processor available in data packets and without connecting to the at least one of the plurality of wireless networks; and
a Wi-Fi virtualization manager communicatively coupled to the L2 switch, to virtualize the wireless interface such that the wireless interface concurrently communicates with the plurality of host processors, and wherein the WNAV processor is configured to:
multiplex data packets received from the plurality of host processors through each of the respective pseudo interface drivers;
transmit the multiplexed data packets to the access point of the at least one of the plurality of wireless networks through the wireless interface;
receive data packets from the access point of the at least one of the plurality of wireless network through the wireless interface;
parse the received data packets from at least one of the plurality of wireless networks by the L2 switch to determine a MAC address, wherein the MAC address is indicative of a host from amongst the plurality of hosts processors for which the received data packets are destined; and
route the received data packets to each of the plurality of host processors through the respective pseudo interface driver, based on the MAC address associated with the each of the plurality of host processors.

2. The multi-host computing system, as claimed in claim 1, wherein the wireless interface is configured to support a plurality of MAC addresses so as to exchange packets between the plurality of host processors and at least one of the plurality of wireless networks.

3. The multi-host computing system, as claimed in claim 1, wherein the WNAV processor further comprises the Wi-Fi virtualization manager configured to:
maintain configuration settings of each of the plurality of host processors with respect to the access point of the at least one of the plurality of wireless networks; and
determine a system configuration setting, based in part on the maintained configuration settings, to connect to the access point through the wireless interface.

4. The multi-host computing system, as claimed in claim 1, wherein the wireless interface is configured to operate in a promiscuous mode so as to exchange data packets corresponding to the plurality of host processors.

5. The multi-host computing system, as claimed in claim 4, wherein the L2 switch is further configured to drop data packets based on MAC addresses associated with the data packets, wherein the MAC addresses are not associated with the plurality of host processors and wherein the wireless interface is in the promiscuous mode.

6. The multi-host computing system, as claimed in claim 1, wherein the L2 switch is further configured to forward at least one of multi-cast messages and broadcast messages to each of the plurality of host processors, based in part on a message subscription setting of each of the plurality of host processors.

7. The multi-host computing system, as claimed in claim 1, wherein the wireless interface is configured as a dedicated wireless interface with respect to each of the plurality of host processors, so as to enable each of the plurality of host processors to control the wireless interface independently with respect to the other host processors of the plurality of host processors, through respective pseudo interface drivers.

8. The multi-host computing system, as claimed in claim 1, wherein WNAV processor is configured as a multi-root aware device with respect to the each of the plurality of host processors.

9. The multi-host computing system, as claimed in claim 1, wherein the WNAV processor is configured as at least one of a Peripheral Component Interconnect Express (PCie) device, Peripheral Component Interconnect (PCI) device, a non PCie compliant device and a non-PCI compliant device with respect to at least one of the plurality of host processors.

10. The multi-host computing system, as claimed in claim 1, wherein the WNAV processor is further configured to:
receive data packets from a first host from amongst the plurality of host-processors;
parse the received data packets to determine a destination MAC address, wherein the destination MAC address is of a second host from amongst the plurality of host processors; and
forward the received data packets to the second host over an inter processor communication bus, based in part on the determined destination MAC address.

11. method for providing simultaneous access of a wireless interface to a plurality of host processors of a multi-host computing system, the method comprising:
configuring, by a Wireless Network Access Virtualization (WNAV) processor of the multi-host computing system, the wireless interface for the plurality of host processors, each of the plurality of host processors having pseudo interface drivers to assign a unique media access control (MAC) address to the wireless interface, and communicatively couple the plurality of host processors with the WNAV processor through an Inter Processor Communication (IPC) bus, wherein the IPC bus provides lossless communication between the host processor and the WNAV processor, wherein each host processor is communicatively coupled to the L2 switch by a separate IPC bus, and wherein the WNAV processor allows direct communication between any two host processors from amongst the plurality of host processors based on MAC address information of a host processor available in data packets and without connecting to the at least one of the plurality of wireless networks;

transmitting, by the WNAV processor, a plurality of association requests to an access point of a wireless network to connect the plurality of host processors with the wireless network, based on the unique MAC address assigned by each of the plurality of host processors, wherein the WNAV processor provides simultaneous access of the plurality of wireless networks to the plurality of host processors;

parsing, by the WNAV processor, received data packets from at least one of the plurality of wireless networks to determine the MAC address, wherein the MAC address is indicative of a host processor from amongst the plurality of host processors for which the received data packets are destined; and routing, by the WNAV processor, received data packets to at least one of the plurality of host processors through respective pseudo interface drivers, based on the unique MAC address assigned by each of the plurality of host processors associated with the received data packets.

12. The method as claimed in claim 11, wherein the method further comprises sending a positive acknowledgement to the access point on receipt of a data packet addressed to at least one of the plurality of host processors.

13. The method as claimed in claim 11, wherein the method further comprises:

configuring the wireless interface to operate in a promiscuous mode so as to exchange packets corresponding to the plurality of host processors;

parsing the received data packets from at least one of the plurality of wireless networks to determine the MAC address, wherein the MAC address is indicative of a host from amongst the plurality of host processors for which the received data packets are destined;

dropping received packets from the wireless network, on determining the received packets not to be addressed to at least one of the plurality of host processors, based in part on the MAC address associated with the received data packets; and forwarding the data packets to the destined host from amongst the plurality of host processors.

14. A method for providing simultaneous access of a wireless interface to a plurality of host processors of a multi-host computing system, the method comprising:

configuring, by a Wireless Network Access Virtualization (WNAV) processor of the multi-host computing system, the wireless interface for one of a host processor from amongst the plurality of host processors to assign a unique MAC address to the wireless interface, wherein each of the plurality of host processors includes pseudo interface drivers to communicate with the wireless interface and communicatively couple the plurality of host processors with the WNAV processor through an Inter Processor Communication (IPC) bus, wherein the IPC bus provides lossless communication between the host processor and the WNAV processor, wherein each host processor is communicatively coupled to the L2 switch by a separate IPC bus, and the WNAV processor allows direct communication between any two host processors from amongst the plurality of host processors based on MAC address information of a host processor available in data packets and without connecting to the at least one of the plurality of wireless networks, wherein the WNAV processor provides simultaneous access of the plurality of wireless networks to the plurality of host processors, and wherein the wireless interface is configured as a station bridge to project to the access point that the plurality of host processors are associated with the station bridge;

transmitting, by the WNAV processor, an association request to an access point of a wireless network with information about the presence of the plurality of host processors from the station bridge connecting each of the plurality of host processors with one of the plurality of the wireless networks through the unique MAC address, wherein the information indicates MAC addresses of each of the plurality of host processors associated with the wireless interface;

parsing, by the WNAV processor, the received data packets from at least one of the plurality of wireless networks to determine the MAC address, wherein the MAC address is indicative of a host from amongst the plurality of host processors for which the received data packets are destined; and routing, by the WNAV processor, data packets received at the unique MAC address to at least one of the plurality of host processors through respective pseudo interface drivers, based in part on the MAC address of each of the plurality of host processors associated with the received data packets.

15. The method as claimed in claim 14, wherein the method further comprises sending a positive acknowledgement to the access point on receipt of a data packet addressed to at least one of the plurality of host processors.

16. The method as claimed in claim 14, wherein the method further comprises:

configuring, by the WNAV processor, the wireless interface to operate in a promiscuous mode so as to exchange packets corresponding to the plurality of host processors;

parsing, by the WNAV processor, the received data packets from at least one of the plurality of wireless networks to determine the MAC address, wherein the MAC address is indicative of the host from amongst the plurality of host processors for which the received data packets are destined;

dropping, by the WNAV processor, received packets from the wireless network, on determining the received packets not to be addressed to at least one of the plurality of host processors, based in part on the MAC address associated with the received data packets; and forwarding, by the WNAV processor, the data packets to the destined host from amongst the plurality of host processors.

* * * * *